(12) United States Patent
Atta et al.

(10) Patent No.: US 12,126,731 B2
(45) Date of Patent: Oct. 22, 2024

(54) SYSTEM AND METHOD FOR SECURING HOST DEVICES

(71) Applicant: Dell Products L.P., Round Rock, TX (US)

(72) Inventors: Venkata Rama Krishna Rao Atta, Tellapur (IN); Sumanth Vidyadhara, Bangalore (IN); Adolfo Sandor Montero, Pflugerville, TX (US); Young Hwan Jang, Thomson Grand (SG)

(73) Assignee: Dell Products L.P., Round Rock, TX (US)

( * ) Notice: Subject to any disclaimer, the term of this patent is extended or adjusted under 35 U.S.C. 154(b) by 595 days.

(21) Appl. No.: 17/513,149

(22) Filed: Oct. 28, 2021

(65) Prior Publication Data

US 2023/0138905 A1    May 4, 2023

(51) Int. Cl.
| | |
|---|---|
| *H04L 9/32* | (2006.01) |
| *G06F 21/62* | (2013.01) |
| *H04L 9/08* | (2006.01) |
| *H04L 67/141* | (2022.01) |

(52) U.S. Cl.
CPC ............ *H04L 9/3239* (2013.01); *G06F 21/62* (2013.01); *H04L 9/083* (2013.01); *H04L 9/0866* (2013.01); *H04L 9/0894* (2013.01); *H04L 67/141* (2013.01)

(58) Field of Classification Search
CPC ... H04L 67/141; H04L 9/0894; H04L 9/0866; H04L 9/083; H04L 9/3239; H04L 9/32; G06F 21/62; G06F 21/00; G06F 21/30; G06F 21/60; H04W 12/00; H04W 12/06

USPC .......................................................... 713/168
See application file for complete search history.

(56) References Cited

U.S. PATENT DOCUMENTS

| | | | |
|---|---|---|---|
| 10,110,383 B1* | 10/2018 | Tamilarasan | .......... H04L 9/3297 |
| 2010/0031337 A1* | 2/2010 | Black | .................. H04L 63/0471 |
| | | | 709/217 |
| 2014/0089202 A1* | 3/2014 | Bond | ....................... H04L 9/14 |
| | | | 713/166 |
| 2017/0353309 A1* | 12/2017 | Gray | ...................... G06F 21/51 |
| 2019/0149530 A1* | 5/2019 | Ma | .................... H04W 12/0471 |
| | | | 726/3 |
| 2023/0177197 A1* | 6/2023 | Brown | ................ G06F 21/6209 |
| | | | 713/171 |
| 2023/0179425 A1* | 6/2023 | Brown | .................... G06F 21/64 |
| | | | 713/168 |

FOREIGN PATENT DOCUMENTS

| | | | | |
|---|---|---|---|---|
| WO | WO-9906914 A2 * | 2/1999 | ....... G06F 17/30345 |
| WO | WO-2019177984 A1 * | 9/2019 | ........... G06Q 20/322 |

* cited by examiner

*Primary Examiner* — Josnel Jeudy
(74) *Attorney, Agent, or Firm* — Womble Bond Dickinson (US) LLP

(57) ABSTRACT

Methods and systems for managing the operation of host devices is disclosed. A host device may include a computing device that operates in accordance with operation data. The operation data may include, for example, startup data such as code for a management entity (e.g., a basic input output system), settings (e.g., hardware and/or software) for the startup management entity, setting for general operation after booting to an operating system, copies of code (e.g., computer instructions executable with a processor) for applications to be executed by the host device, etc. If the operation data is modified, operation of the host device may be similarly modified.

20 Claims, 11 Drawing Sheets

SYSTEM AND METHOD FOR SECURING HOST DEVICES

FIELD OF THE INVENTION

Embodiments disclosed herein relate generally to device management. More particularly, embodiments disclosed herein relate to systems and methods to secure the operation of devices through data access.

BACKGROUND

Computing devices may store data and used stored data. For example, computing devices may utilize data when providing computer implemented services. If computing devices are unable to access data, the computing devices may be unable to provide some, or all, of the computer implemented services that they are able to provide with access to data.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
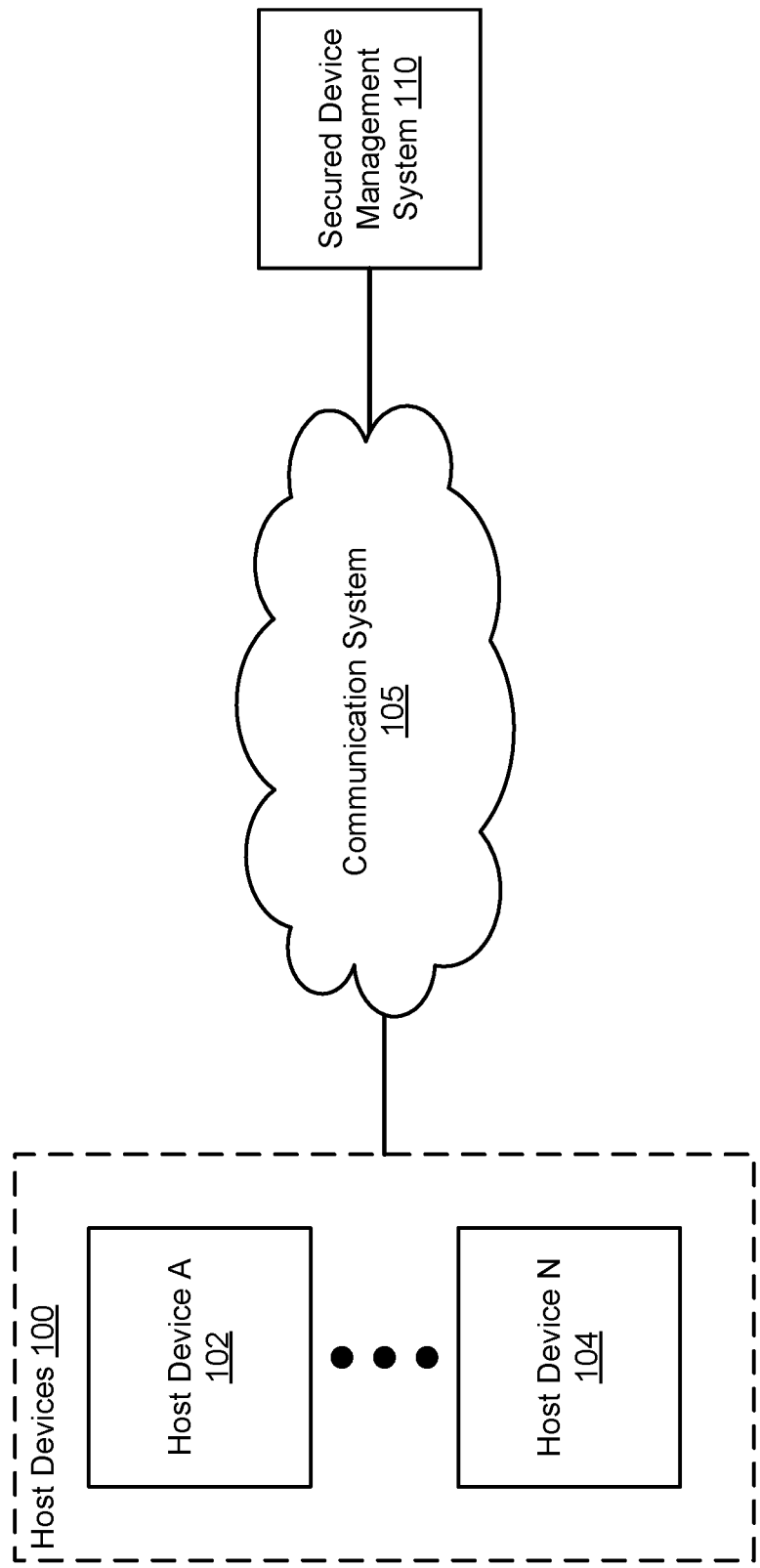
FIG. 1 shows a block diagram illustrating a system in accordance with an embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

In general, embodiments of the invention relate to methods and systems for managing the operation of host devices. A host device may include a computing device that operates in accordance with operation data. The operation data may include, for example, startup data such as code for a management entity (e.g., a basic input output system), settings (e.g., hardware and/or software) for the startup management entity, setting for general operation after booting to an operating system, copies of code (e.g., computer instructions executable with a processor) for applications to be executed by the host device, etc. If the operation data is modified, operation of the host device may be similarly modified.

To manage the operation of the host device, access to the operation data may be restricted. For example, the operation data may be stored in a secured storage location in a secure storage device. The secure storage device may secure the operation data with key or other data structure (e.g., permanent authentication data) such that write access to the operation data may not be available without the permanent authentication data. A copy of the permanent authentication data may not be generally available to entities hosted by the host device, other than the secure storage device which may not provide or otherwise allow other entities to gain access to its copy of the permanent authentication data. In an embodiment, the secure storage device stores its copy of the permanent authentication data in a one-time-programmable storage location. Consequently, once the secure storage device is programmed to limit access to operation data (e.g., which may be stored in a partition or other region of the storage resources of the secure storage device), it may not be reprogrammable to use other information to secure the operation data.

To provide for reuse of secure storage devices, embodiments disclosed herein may provide host devices that may host management controllers operably connected to secured device management systems. The management controllers and secured device management systems may provide for the secure management and distribution of permanent authentication data in a manner that allows for secure storage devices to be used (e.g., provisioned to) any number of host devices. To do so, the management controllers may participate in the management and retrieval of permanent authentication data stored in the secured device management system. As the secured storage device is provisioned to different host device, the information stored in the management controller and secured device management system may be updated correspondingly.

In this manner, as the secured storage device is provisioned to different host devices, each of the host devices may be able to appropriately retrieve, at least temporarily, the data necessary to gain write access to the operation data stored in the secure storage devices. By doing so, when an update for the operation data is obtained, the operation data may be appropriately updated thereby modifying the operation of the host system in the future in accordance with the update.

To provide for updating of operation data, various types of authentication data may be stored (i) in a secure storage device, (ii) in a management controller hosted by a host device that will host the secure storage device, and (iii) in the secured device management system. Once the authentication data is stored, it may be used to make appropriate updates to the operation data (e.g., by making changes to an image of an operating system or other type of data that governs the operation of the host device) through securing temporary write access to the operation data in the secure storage device. When a secure storage device is to be provisioned to a different host device, various portions of the authentication data may be updated to reflect the new location and provisioning of the secure storage device.

By doing so, a system in accordance with embodiments disclosed herein may be more likely to operate in a desired manner by restricting access to operation data. By operating in the desire manner, a host device may be more likely to successfully provide desired computer implemented services. Further, by tracking and updating authentication data, the system may be able to facilitate further provisioning of secure storage devices that may provide for their provisioning through single write functionality. Thus, a system in accordance with embodiments disclosed herein may provide for the reuse and provisioning of hardware assets that would otherwise be rendered useless by virtue of their native security functionality (e.g., single-write for authentication data).

In an embodiment, a computer-implemented method for managing operation of a host device is provided. The method may include obtaining an update to operation data stored on a secure storage device of the host device that is secured with a permanent authentication key, the operation data defining how the host device operates; in response to obtaining the update: establishing, by a management controller of the host device and using a temporary authentication key stored in the management controller, a secure communication channel to a secured device management system; obtaining, by the management controller and with the secure communication channel, a copy of the permanent authentication key; verifying authenticity of the permanent authentication key using a copy of a hash of the permanent authentication key hosted by the management controller; and modifying, with the update and the permanent authentication key, the operation data in the secure storage device.

The operation data may be modified by an application hosted with a processor of the host device, the host device may not have access to a copy of the permanent authentication data other than via the management controller, the management controller may provide the permanent authentication key to the application after the authenticity of the permanent authentication key is verified, and the management controller may be adapted to not provide the permanent authentication key to the application unless the permanent authentication key is validated.

The method may also include, prior to obtaining the update: generating the permanent authentication key with an identifier of the secure storage device; storing a first copy of the permanent authentication key in a controller of the secure storage device; storing a second copy of the permanent authentication key in the secured device management system, the secured device management system being remote to the host device; generating the hash of the permanent authentication key to obtain a permanent authentication key hash; and storing a copy of the permanent authentication key hash in the management controller.

The method may also include, prior to obtaining the update: generating the temporary authentication key with an identifier of the host device, the identifier of the secure storage device, and the permanent authentication key; storing a first copy of the temporary authentication key in the management controller; and storing a second copy of the temporary authentication key in the secured device management system.

The method may further include, after modifying the operation data: obtaining a retirement request associated with the host device; based on the retirement request: removing all copies of the temporary authentication key from the secured device management system and the management controller; and removing a copies of the permanent authentication key hash from the management controller.

The method may also include, after servicing the retirement request: obtaining a repurposing request associated with a new host device; based on the repurposing request: generating a second temporary authentication key using an identifier of the new host device, the identifier of the secure storage device, and the permanent authentication key; and storing a first copy of the second temporary authentication key in a second management controller of the new host device; storing a second copy of the second temporary authentication key in the secured device management system; and storing the permanent authentication key hash in the second management controller of the new host device.

Servicing the retirement request may disassociate the secure storage device from the host device and servicing the repurposing request may associate the new host device with the secure storage device. The secured device management system may be adapted to track the associations between host devices and secure storage devices.

The management controller may operate independently from the host device, the management controller and the host device may each include respective computing devices.

Obtaining the permanent authentication key may include providing an identifier of the secure storage device to the secured device management system; using, by the secured device management system, the identifier of the secure storage device as a key to identify the copy of the permanent authentication key stored in the secured device management system; and transmitting, with the secure communication channel, the copy of the permanent authentication key from the secured device management system to the management controller.

The method may additionally include, prior to modifying the operation data in the secure storage device: comparing, by a controller of the secure storage device, the copy of the permanent authentication key to another copy of the permanent authentication key stored in the controller; based on the copy of the permanent authentication key matching the permanent authentication key, authorizing write access to the operation data for an application hosted with a processor of the host device.

In an embodiment, a non-transitory media is provided. The non-transitory media may include instructions that when executed by a processor cause the computer-implemented method to be performed.

In an embodiment, a data processing system (e.g., part of a host device) is provided. The data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide any quantity and type of computer implemented services. To provide computer implemented services, the system of FIG. 1 may include one or more host devices 100 operably connected to a secured device management system 110. Each of these components is discussed below.

All, or a portion, of host devices 102-104 may provide computer implemented services to users and/or other computing devices operably connected to the host devices 100. The computer implemented services may include any type and quantity of services including, for example, database services, instant messaging services, video conferencing services, etc. To provide these services, host devices 100 may host applications that provide these (and/or other) computer implemented services. The applications (or other types of executing entities) may presume (and/or may require for proper operation of the applications) that a host device hosting the application is operating in a predetermined manner. The predetermined manner of operation may include, for example, executing an operating system, drivers, or other type of management entities that mediate, facilitate, or otherwise operate in a manner which enables the applications to operate (e.g., by providing abstracted access to hardware resources used in the execution of the applications).

To operate in the predetermined manner, host devices 100 may perform one or more operations to enter the predetermined manner of operation (by changing from other manners of operation to the predetermined manner of operation). These operations may include, for example, a boot process from a power-on (or reset or other manner of operation that differs from the predetermined manner of operation to the extent that the applications may not be able to operate) to hand off operation of the host device to an operating system or other type of operational management entity that places host devices 100 into the predetermined manner of operation. The operating system may, for example, provide abstracted access to resources utilized by the applications hosted by the host device.

For example, consider a scenario where a host device has been shut off. After the host device is turned on, the host device may be operating in a startup manner such that the host device is not yet able to support execution of an application (e.g., the application may not be able to successfully execute until the host device hosts an operating system). To enter the predetermine manner of operation conducive to execution of the application, the host device may go through a boot process which may be performed by a type of management entity such as a basic input-output system and/or other startup management entities. The management entity may perform any number of actions (e.g., a "boot process") to prepare the host device to begin execution of an operating system or other type of management entity that facilitates execution of application (and/or operation of certain types of hardware devices such as application specific integrated circuits that may provide certain functions without need for a software layer).

These actions may include, for example, inventorying the hardware components hosted by a host device, loading drivers or other software components, configuring hardware and/or software components, etc. As part of the boot process, the management entity may also load code, configuration settings, and/or other data corresponding to an operating system (or other management entity type or other types of executing entities) to memory. The data may be stored in persistent storage thereby allowing it to be read into memory.

Once the data is loaded into memory, the host device may initiate execution of code (e.g., computer instructions) included in the data in memory to begin operation of the operating system. The executing code may utilize configuration settings and/or other information also included in the data in memory.

Once the host device hosts the operating system and/or performs other types of predetermined operations, discussed above, then the applications may begin to provide the computer implemented services. However, the aforementioned process, if not completed in a predetermined manner, may leave the host device in a condition where it is unable to provide the computer implemented services, may provide compromised computer implemented services, and/or may otherwise operate in a manner different from expected, desired, etc.

In general, embodiments disclosed herein relate to systems, devices, and methods for improving the likelihood that host devices 100 are able to provide their computer implemented services. To improve the likelihood that host devices 100 are able to provide their computer implemented services, host devices 100 may limit access to data (e.g., operation data) used during the startup and/or operation of the host devices. For example, host devices 100 may store such data in a secured format. The secured data may not be modifiable without providing, for example, an authentication key to a device on which the secure data is stored. By limiting access to the secured data, it may be more likely that a host device is able to enter a predetermined operating state conducive to providing computer implemented services.

Host devices 102-104 may be implemented using a computing device such as a host or server, a personal computer (e.g., desktops, laptops, and tablets), a "thin" client, a personal digital assistant (PDA), a Web enabled appliance, a mobile phone (e.g., Smartphone), and/or any other type of data processing device or system. For additional details regarding computing devices, refer to FIG. 6. For additional details regarding host devices 100, refer to FIG. 2A.

The system of FIG. 1 may include any number and types of host devices 100. Any of the aforementioned devices may operate independently and/or cooperatively to provide computer implemented services. Host devices 100 may provide such services to, for example, user of the host devices 100, to other host devices 100, and/or to other devices not shown in FIG.

Secured device management system 110 may provide access data management services. Access data management services may limit access to authentication keys, or other types of data structures, which may be usable to modify secure data of host devices 100. For example, secured device management system 110 may store copies of data usable to gain write access to startup data (or other types of data secured in host devices 100) that may define the manner in which a host device will operate. Secured device management system 110 may provide the aforementioned keys and/or other types of information to allow the startup data to be modified (e.g., to upgrade or otherwise change the manner of operation of host devices 100). Secured device management system 110 may only provide the aforementioned keys and/or other types of information when certain conditions are met to limit the possibility of the startup data being modified in an undesirable manner (e.g., as part of an attack by a third party).

Secured device management system 110 may be implemented using a computing device such as a host or server, a personal computer (e.g., desktops, laptops, and tablets), a "thin" client, a personal digital assistant (PDA), a Web enabled appliance, a mobile phone (e.g., Smartphone), and/or any other type of data processing device or system. For additional details regarding computing devices, refer to FIG. 6. For additional details regarding secured device management system 110, refer to FIG. 2C.

In an embodiment, communication system 105 includes one or more networks that facilitate communication between host devices 100 and secured device management system 110. The networks may include, for example, wired networks, wireless network, public networks, private network, the Internet, etc.

While illustrated in FIG. 1 as included a limited number of specific components, a system in accordance with an embodiment may include fewer, additional, and/or different components than those illustrated therein.

Figure 2A:
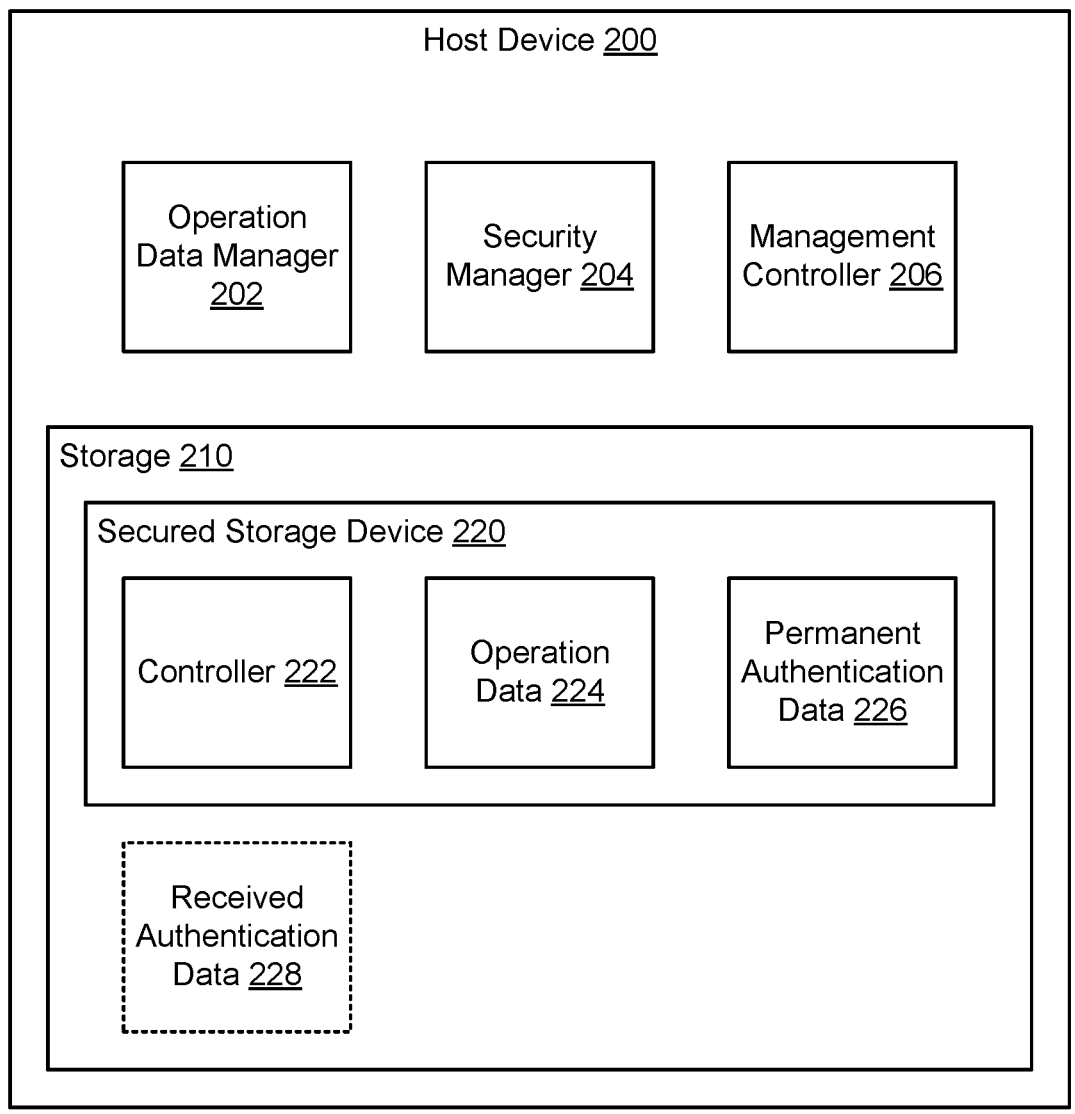
FIG. 2A shows a block diagram illustrating a host device in accordance with an embodiment.

Turning to FIG. 2A, a diagram of an example host device 200 in accordance with an embodiment is shown. Host device 200 may be similar to any of host devices 100.

Host device 200 may provide any number and type of computer implemented services. To provide the computer implemented services, host device 200 may enter into a predetermined operating state defined by operation data 224 stored in secured storage device 220 of storage 210. To increase the likelihood of entering the predetermined operating state, host device 200 may limit access to operation data 224. For example, access to operation data 224 may be secured with permanent authentication data 226. To modify operation data 224, an entity hosted by host device 200 (or remotely) may need to provide a copy of permanent authentication data 226. Generally, host device 200 (other than secured storage device 220) may not store or otherwise have access to permanent authentication data 226 except through secures device management system 110.

To provide its functionality, host device 200 may include operation data manager 202, security manager 204, management controller 206, and storage 210. Each of these components is discussed below.

Operation data manager 202 may provide operation data update services. Operation data update services may include (i) obtaining updates for operation data 224, (ii) obtaining copies of permanent authentication data 226, and (iii) updating operation data 224 with one or more updates and the obtained copies of permanent authentication data 226. By providing its functionality, the operation of host device 200 may be updated over time.

Security manager 204 may provide security services. Security services may include (i) obtaining requests for permanent authentication data 226 from, for example, operation data manager 202, (ii) obtaining information regarding various components of host devices 200 (e.g., such as an identifier of secured storage device 220 and/or host device 200 such as service/device tags), (iii) providing the aforementioned information to management controller 206 to initiate a process of obtaining a copy of permanent authentication data 226, (iv) obtaining the copy of permanent authentication data 226 from management controller 206, and/or (v) providing the obtained copy of permanent authentication data 226 to operation data manager 202 so that operation data manager 202 may update operation data 224.

When operation data manager 202 receives a copy of authentication data from security manager 204, operation data manager 202 may not know whether the authentication data it obtained matches that stored in secured storage device 220. Consequently, when operation data manager 202 attempts to use the authentication data to gain write access to operation data 224, the received authentication data 228 that it provides to secured storage device 220 may or may not facilitate write access to operation data 224. In FIG. 2A, received authentication data 228 is illustrated with dashed outlining to indicate that it may not be present at all times and its content may change as various authentication data is obtained by management controller 206.

In an embodiment, operation data manager 202 and/or security manager 204 is implemented using a hardware device including circuitry. The hardware device may be, for example, a digital signal processor, a field programmable gate array, or an application specific integrated circuit. The circuitry may be adapted to cause the hardware device to perform the functionality of operation data manager 202 and/or security manager 204. Operation data manager 202 and/or security manager 204 may be implemented using other types of hardware devices without departing from the invention.

In an embodiment, operation data manager 202 and/or security manager 204 is implemented using a processor adapted to execute computing code stored on a persistent storage that when executed by the processor performs the functionality of operation data manager 202 and/or security manager 204 discussed throughout this application. The processor may be a hardware processor including circuitry such as, for example, a central processing unit or a microcontroller. The processor may be other types of hardware devices for processing digital information without departing from the invention.

When providing their functionalities, operation data manager 202 and/or security manager 204 (e.g., collectively a "data manager") may perform all, or a portion, of the methods illustrated in FIGS. 3A-5B.

Management controller 206 may provide authentication data management services. Authentication data management services may include (i) obtaining requests for authentication data (e.g., from security manager 204), (ii) establishing secure connections with secured device management systems, (iii) obtaining, via the secure connections, authentication data, (iv) verifying whether obtained authentication data is usable to modify operation data stored in a secure storage device (e.g., 220), and (v) when the authentication data is validated, providing the validated authentication data to other entities (e.g., security manager 204 which may provide it to operation data manager 202) for use.

In an embodiment, management controller 206 is implemented with an in band and/or out of band management controller hosted by host device 200. For example, management controller 206 may be implemented with a separate, independently operating computing device operably connected to the components of host device 200 via one or more communication interfaces. The one or more communication interfaces may allow management controller 206 to communication with operation data manager 202, security manager 204, and/or other entities hosted by host device 200.

In an embodiment, management controller 206 implements a secured communication system. The secured communication systems may limit the types of communications, quantities of communications, formats of communications, and/or other aspects of communication between management controller 206 and/or entities. For example, management controller 206 may implement a mailbox system or other type of virtualized (or software defined) communication end point scheme such that management controller 206 may appear to be a separate device to host device 200

(and/or other entities such as, for example, a secured device management system). To communicate with management controller 206, operation data manager 202, security manager 204, and/or other entities may send communications to an end point associated with management controller 206.

Management controller 206 may operate independently of host device 200 and/or invoke various functionalities of host device 200 to provide all, or a part, of its functionality. For example, to communicate with other devices, management controller 206 may utilize communication hardware of host device 200.

Figure 2B:
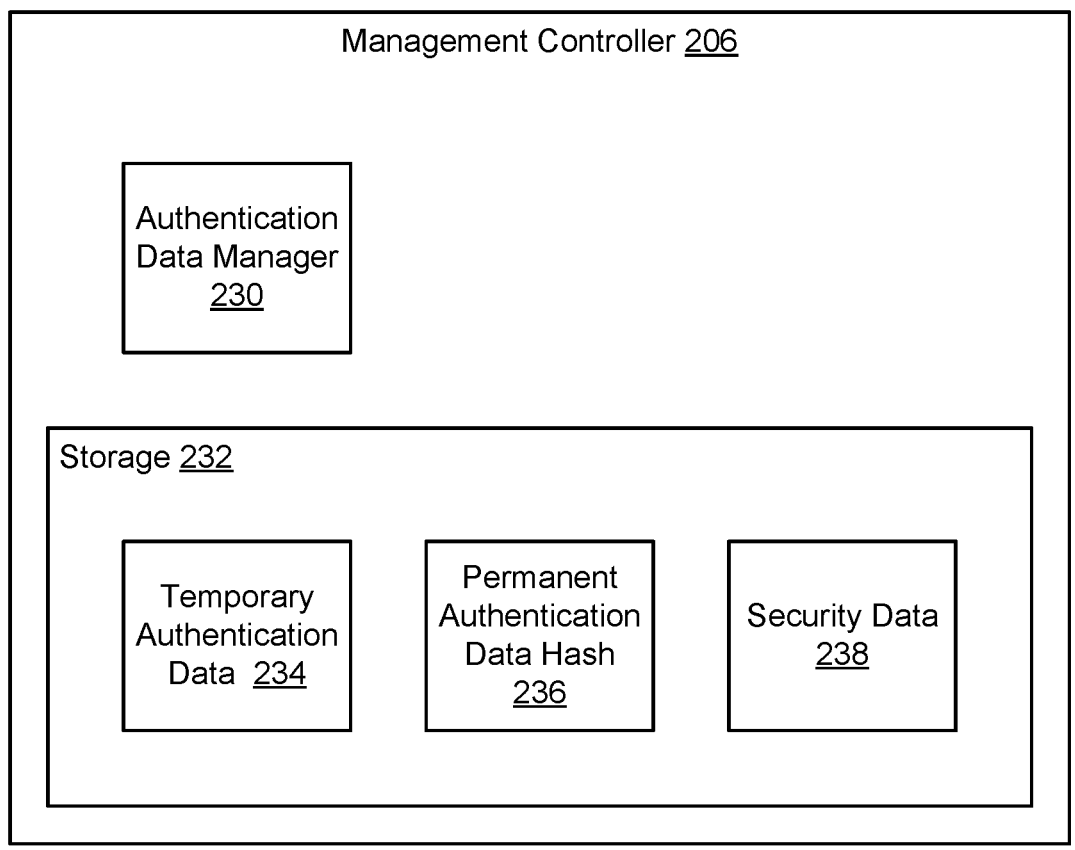
FIG. 2B shows a block diagram illustrating a management controller in accordance with an embodiment.

For additional details regarding management controller 206, refer to FIG. 2B and the corresponding discussion.

When providing its functionality, management controller 206 may perform all, or a portion, of the methods illustrated in FIGS. 3A-5B.

In an embodiment, storage 210 is implemented using physical devices that provide data storage services (e.g., storing data and providing copies of previously stored data). The devices that provide data storage services may include hardware devices and/or logical devices. For example, storage 210 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 210 may include a memory device (e.g., a dual in line memory device) in which data is stored and from which copies of previously stored data are provided. In another example, storage 210 may include a persistent storage device (e.g., a solid-state disk drive) in which data is stored and from which copies of previously stored data is provided. In a still further example, storage 210 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 210 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

In an embodiment, storage 210 is implemented with secured storage device 220. Secured storage device 220 may include a hardware storage device for storing data. Secured storage device 220 may include controller 222 and may store data structures in its storage resources including, for example, operation data 224 and permanent authentication data 226.

Controller 222 may include a physical device for managing data access requests from, for example, operation data manager 202 and/or other entities. For example, controller 222 may receive data access requests and service them by providing copies of stored data (e.g., in secured storage device 220) and/or by modifying existing data (e.g., operation data 224).

When determining how to service a data access request, controller 222 may take into account whether write access for data stored in secured storage device 220 impacted by a data access request has been granted (e.g., to an entity associated with the data access request). If write access has not been granted, then controller 222 may not modify data even when an access request that requests modification of data is being serviced. In contrast, if write access has been granted, then controller 222 may modify the data when an access request that requests modification of data is being serviced. In this manner, the contents of operation data 224 may be maintained in a manner that makes it more likely that host device 200 will operate in accordance with a predetermined manner (e.g., a desired/expected manner of operation).

Controller 222 may require that an entity desiring to modify operation data 224 provide a copy of permanent authentication data 226 prior to being provided with write access for operation data 224. For example, operation data 224 may be stored in a partition or in other manners that are write access limited. Thus, operation data 224 may not be modified by operation data manager 202 until write access for operation data 224 has been obtained.

Storage 210 may store data structures including operation data 224, permanent authentication data 226, and received authentication data 228. The data structures stored in storage 210 may be implemented using, for example, lists, tables, unstructured data, trees, databases, etc. While illustrated in FIG. 2A as being stored locally, the data structures (other than, e.g., operation data 224 and permanent authentication data 226) may be stored remotely and may be distributed across any number of devices without departing from embodiments of the invention.

While illustrated in FIG. 2A as including a limited number of specific components, a host device in accordance with an embodiment may include fewer, additional, and/or different components than shown herein.

Turning to FIG. 2B, a diagram of management controller 206 in accordance with an embodiment is shown. As discussed above, management controller 206 may provide authentication data management services. To provide its functionality, management controller 206 may include authentication data manager 230 and storage 232. Each of these components is discussed below.

Authentication data manager 230 may orchestrate the authentication data management services provided by management controller 206. For example, authentication data manager 230 may service communications from other entities, may secure communications with other devices, may validate authentication data retrieved from other devices, etc.

In an embodiment, authentication data manager 230 is implemented using a hardware device including circuitry. The hardware device may be, for example, a digital signal processor, a field programmable gate array, or an application specific integrated circuit. The circuitry may be adapted to cause the hardware device to perform the functionality of authentication data manager 230. Authentication data manager 230 may be implemented using other types of hardware devices without departing from the invention.

In an embodiment, authentication data manager 230 is implemented using a processor adapted to execute computing code stored on a persistent storage that when executed by the processor performs the functionality of authentication data manager 230 discussed throughout this application. The processor may be a hardware processor including circuitry such as, for example, a central processing unit or a microcontroller. The processor may be other types of hardware devices for processing digital information without departing from the invention.

When providing its functionalities, authentication data manager 230 may perform all, or a portion, of the methods illustrated in FIGS. 3A-5B.

In an embodiment, storage 232 is implemented using physical devices that provide data storage services (e.g., storing data and providing copies of previously stored data). The devices that provide data storage services may include hardware devices and/or logical devices. For example, storage 232 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 232 may include a memory device (e.g., a dual in line memory device) in which data is stored and from which copies of previously stored data are provided. In another example, storage 232 may include a persistent storage device (e.g., a solid-state disk drive) in which data is stored and from which copies of previously stored data is provided. In a still further example, storage 232 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 232 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Storage 232 may store data structures including temporary authentication data 234, permanent authentication data hash 236, and security data 238. Each of these data structures is discussed below.

Temporary authentication data 234 may include one or more data structures that include information usable to establish a secure connection with a secured device management system. For example, temporary authentication data 234 may include information usable as a pre-shared key or other secret known to management controller 206 and the secured device management system.

Permanent authentication data hash 236 may include one or more data structures that include information regarding a hash of the permanent authentication data stored in a secure storage device. For example, the permanent authentication data hash 236 may include a hash that may be computed using permanent authentication data and a hash function (e.g., used to generate permanent authentication data hash 236).

Security data 238 may include one or more data structures that include information usable to a secure a communication channel. For example, the security data 238 may include a session key or other type of data structure usable to secure data transmitted via the secure communication channel. The secure communication channel may be formed between management controller 206 and a secured device management system. Security data 238 may be obtained by, for example, performing a public key infrastructure authentication. As part of that process, temporary authentication data 234 may be utilized. In some cases, temporary authentication data 234 may not be utilized. For example, a public-private key exchange may be utilized to establish a session key for subsequent secured communications (e.g., encrypted).

The data structures stored in storage 232 may be implemented using, for example, lists, tables, unstructured data, trees, databases, etc. While illustrated in FIG. 2A as being stored locally, the data structures may be stored remotely and may be distributed across any number of devices without departing from embodiments of the invention.

Figure 2C:
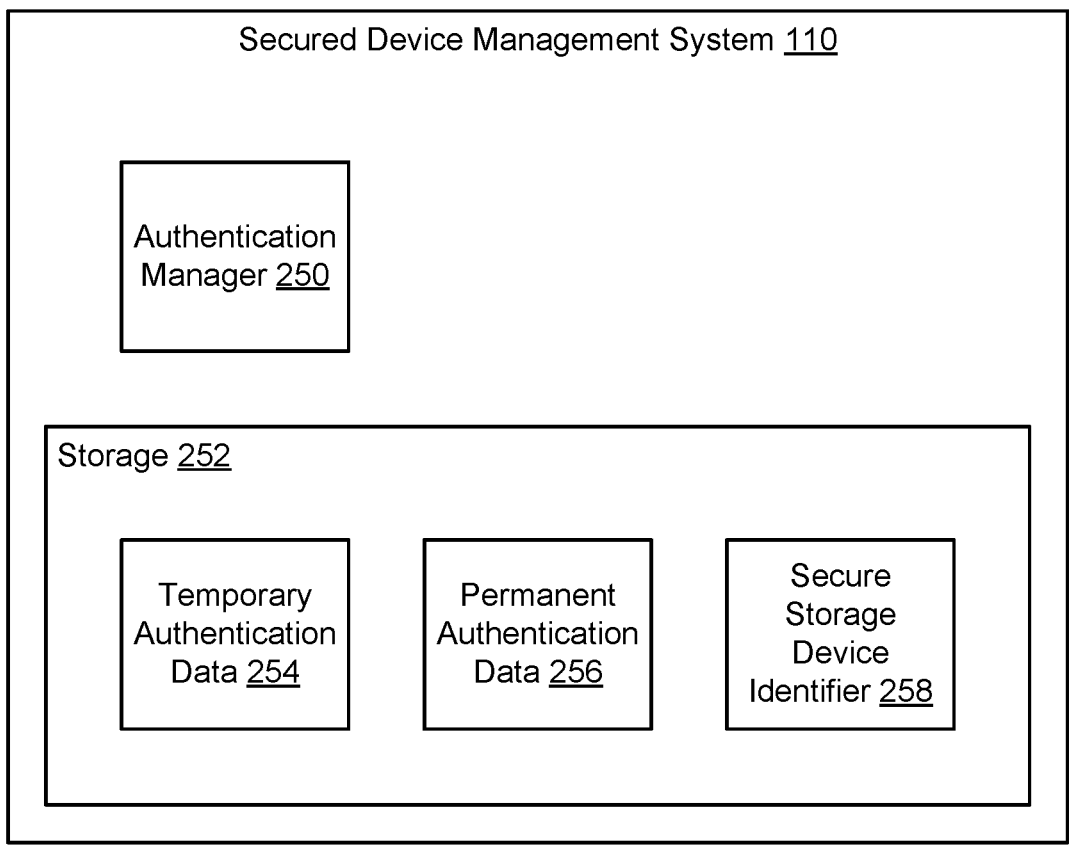
FIG. 2C shows a block diagram illustrating a secured device management system in accordance with an embodiment.

While illustrated in FIG. 2C as including a limited number of specific components, a management controller in accordance with an embodiment may include fewer, additional, and/or different components than shown herein.

Turning to FIG. 2C, a diagram of secured device management system 110 in accordance with an embodiment is shown. As discussed above, secured device management system 110 may selectively provide authentication data to other entities to allow various host devices to update operation data. To provide its functionality, secured device management system 110 may include authentication manager 250 and storage 252. Each of these components is discussed below.

Authentication manager 250 may service requests for authentication data and changes to authentication data. For example, when a secure storage device is initially deployed to a host device, a copy of permanent authentication data (e.g., used to secure operation data in the secure storage device) may be stored in secured device management system 110. Likewise, a copy of temporary authentication key and an identifier of the secure storage device may also be stored. These pieces of data may be associated with one another to allow for the authentication data to be looked up using the identifier of the secure storage device as the key.

To service requests for authentication data, authentication manager 250 may, using an identifier of a secure storage device (e.g., 258) as a key, lookup corresponding authentication data (e.g., 254, 256) stored in storage 252. The secure device storage identifier (e.g., 258) and authentication data may be stored in storage 252 when the secure storage device is provisioned to a particular host device. As will be discussed in greater detail below, the authentication data may be based, at least in part, on the secure storage device identifier and an identifier of the host device.

To service requests for changes in authentication data, authentication manager 250 may, using an identifier of a secure storage device (e.g., 258) as a key, lookup corresponding authentication data (e.g., 254, 256) stored in storage 252 and remove and/or replace the temporary authentication data 254 for a corresponding secure storage device. Such a request may be received when, for example, a secure storage device is to be removed/provisioned to another host device and/or a host device is to be retired.

In an embodiment, authentication manager 250 is implemented using a hardware device including circuitry. The hardware device may be, for example, a digital signal processor, a field programmable gate array, or an application specific integrated circuit. The circuitry may be adapted to cause the hardware device to perform the functionality of authentication manager 250. Authentication manager 250 may be implemented using other types of hardware devices without departing from the invention.

In an embodiment, authentication manager 250 is implemented using a processor adapted to execute computing code stored on a persistent storage that when executed by the processor performs the functionality of authentication manager 250 discussed throughout this application. The processor may be a hardware processor including circuitry such as, for example, a central processing unit or a microcontroller. The processor may be other types of hardware devices for processing digital information without departing from the invention.

When providing its functionalities, authentication manager 250 may perform all, or a portion, of the methods illustrated in FIGS. 3A-5B.

In an embodiment, storage 252 is implemented using physical devices that provide data storage services (e.g., storing data and providing copies of previously stored data). The devices that provide data storage services may include hardware devices and/or logical devices. For example, storage 252 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 252 may include a memory device (e.g., a dual in line memory device) in which data is stored and from which copies of previously stored data are provided. In another example, storage 252 may include a persistent storage device (e.g., a solid-state disk drive) in which data is stored and from which copies of previously stored data is provided. In a still further example, storage 252 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 252 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Storage 252 may store data structures including temporary authentication data 254, permanent authentication data 256, and/or secure storage device identifier 258. Each of these data structures is discussed below.

Temporary authentication data 254 may include one or more data structures that include information usable to establish a secure connection with a host device (e.g., hosting a secure storage device identified by secure storage device identifier 258). For example, temporary authentication data 254 may include information usable as a pre-shared key or other secret known to a management controller of a host device.

Permanent authentication data 256 may include one or more data structures that include information regarding data used to secure operation data in a secure storage device identified by secure storage device identifier 258. For example, the permanent authentication data 256 may include a copy of a key or other type of data of which the secure storage device is aware and uses to secure the operation data.

Secure storage device identifier 258 may include one or more data structures that includes information regarding a secure storage device. For example, the secure storage device identifier 258 may include or may include information regarding an identifier of the secure storage device.

In an embodiment, authentication data for and an identifier of a secure storage device is stored in storage 252 in an associative format such as a database or table entry. Storage 252 may include any number of such associations for any number of secure storage devices. The information in these associations may be updated over time, for example, as secure storage devices are moved between host devices and/or as host devices are retired.

The data structures stored in storage 252 may be implemented using, for example, lists, tables, unstructured data, trees, databases, etc. While illustrated in FIG. 2C as being stored locally, the data structures may be stored remotely and may be distributed across any number of devices without departing from embodiments of the invention.

While illustrated in FIG. 2C as including a limited number of specific components, a management controller in accordance with an embodiment may include fewer, additional, and/or different components than shown herein.

As discussed above, the components of FIG. 1 may perform various methods to increase the likelihood of host devices being able to enter predetermined manners of operating using data stored in secure storage devices. FIGS. 3A, 4A, and 5A-5B illustrate examples of methods that may be performed by the components of FIG. 1. In the diagrams discussed below and shown in these figures, any of the operations may be repeated, performed in different orders, and/or performed in parallel with or a partially overlapping in time manner with other operations.

Figure 3A:
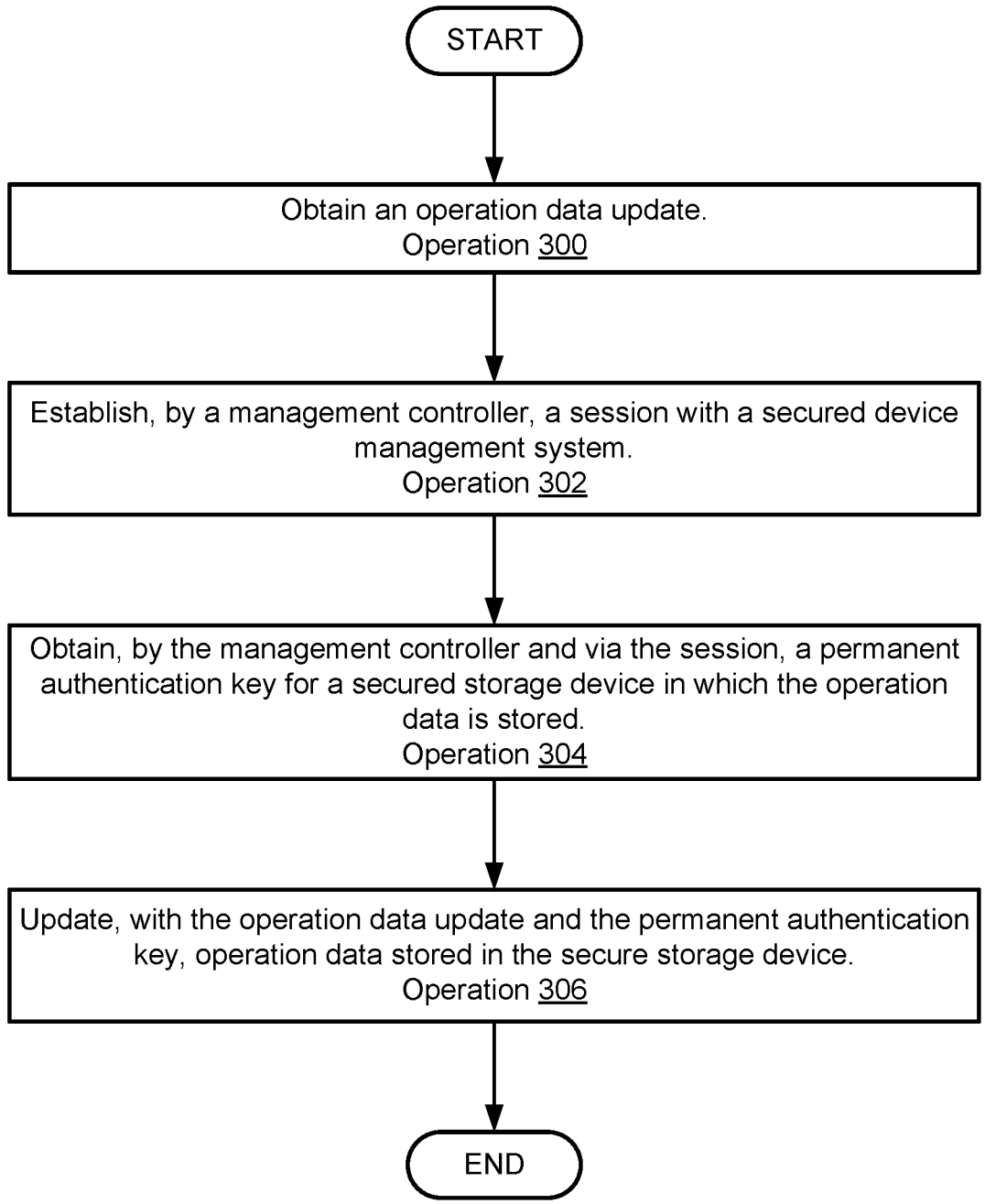
FIG. 3A shows a flow diagram illustrating a method of updating operation of a host device in accordance with an embodiment.

Turning to FIG. 3A, a flow diagram illustrating a method of modifying operation data of a host device according to an embodiment is shown.

Prior to operation 300, a secure storage device may be provisioned to a host device and operation data for the host device may be securely stored in the secure storage device with permanent authentication data. For example, when the host device is manufactured, it may be provisioned with the secure storage device. As part of the provisioning process, data may be stored in various locations, as discussed with respect to FIGS. 4A-4D.

At operation 300, an operation data update for operation data of the host device is obtained. The operation data update may be a data structure that include any quantity of information reflecting changes to operation data for the host device. The operation data update may be obtained from any entity and via any method without departing from embodiments disclosed herein. For example, the operation date update may be obtained via a message from another device. Operation 300 may be performed, for example, by an operation data manager 202 of the host device.

At operation 302, a session with a secured device management system is established. The session may be established by a management controller hosted by the host device.

In an embodiment, the session is established in response to a request for permanent authentication data for a secure storage device hosted by the host device. The operation data manager 202 may, in response to receiving the operation date update, send the request to the management controller.

In an embodiment, the session establishes a secure communication channel between the management controller and the secured device management system. The secure communication channel may provide for encryption of data transmitted between these devices.

In an embodiment, the session is established using temporary authentication data stored in the management controller. The temporary authentication data may be used, for example, as a pre-shared key or other type of secret usable to establish a connection. In an embodiment, the session is established using public-private key sharing such that a session key for the session may be established.

The session key may be used by the management controller and/or the secured device management system to encrypt data transmitted between one another via the session. By doing so, a copy of the permanent authentication data for a secure storage device may be provided to a management controller without copies of it being intercepted or otherwise obtained as part of the transmission of the authentication data.

At operation 304, permanent authentication data for a secure storage device in which the operation data is stored is obtained. The permanent authentication data may be obtained by the management controller of the host device. The permanent authentication data may be obtained via the secure communication channel between the management controller and the secured device management system. For example, the permanent authentication data (e.g., a copy) may be transmitted from the secured device management system to the management controller via the secure communication channel.

At operation 406, operation data stored in the secure storage device is updated. The operation data may be updated by providing the permanent authentication data to the operation data manager (e.g., via a security manager) that has access to the operation data update. The operation data manager may use the permanent authentication data to obtain write access to the operation data (e.g., by providing the copy of the permanent authentication data to a controller of the secure storage device which may verify that it matches the permanent authentication data stored in the secure storage device). Using the write access, the operation data manager may write data to the operation data based on the operation data update. For example, various portions of the operation data may be deleted or rewritten. Additional data may also be added to the operation data with the write access. The operation data update may specify any number and types of modifications to the operation data.

By updating the operation data, the host device may operate in a manner consistent with the changes thereby allowing for the operation of the host device to be changed by changing the operation data.

The method may end following operation 306.

Figure 3B:
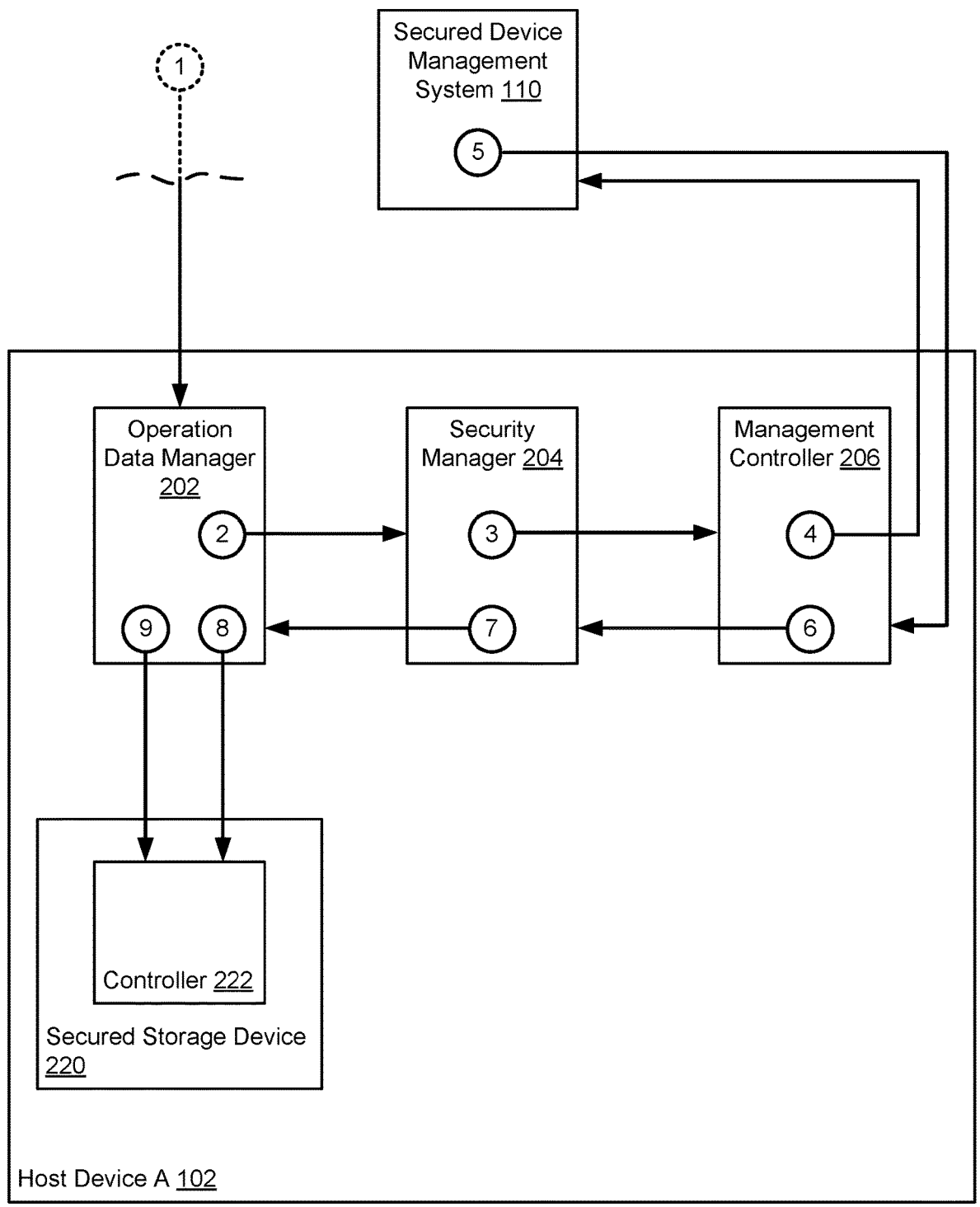
FIG. 3B shows a flow diagram illustrating a series of operation to update the operation of a host device in accordance with an embodiment.

To further clarify embodiments disclosed herein, a process of updating operation data in accordance with embodiments is illustrated in FIG. 3B. In FIG. 3B, a diagram illustrating components of a host device A 102 and a secured device management system 110 are illustrated, along with actions and interactions between various components. In the figure, actions and interactions are illustrated with numbered blocks (e.g., 1-9) and arrows indicating flows of data between these components.

Turning to FIG. 3B, consider an example scenario where at block 1 an operation data update is provided to operation data manager 202. The operation data update may be provided by an entity not shown in FIG. 3B (and block 1 is illustrated with a dashed outline to indicate that the entity is not illustrated). The entity may be, for example, a management entity that is tasked with managing the operation of host device A 102.

In response to obtaining the operation data update, at block 2, operation data manager 202 may send a request for permanent authentication data to a security manager 204. The security manager 204 may, at block 3 and in response to the request, send a request for the permanent authentication data to management controller 206.

In response to receiving the request, at block 4 management controller 206 may establish a secure communication channel to secured device management system 110 and request that a copy of the permanent authentication data for secured storage device 220 be provided. As part of the request, management controller 206 may provide a copy of an identifier for secured storage device 220.

At block 5, secured device management system uses the identifier for secured storage device 220 to lookup the permanent authentication data and provides a copy of the permanent authentication data to management controller 206 in response to the request.

At block 6, management controller 206 verifies the copy of the permanent authentication data by calculating a hash for it and comparing the hash to a pre-existing copy of the hash stored in management controller 206. Based on the verification being successful, management controller 206 provides the copy of the permanent authentication data to security manager 204. In response, at block 7, security manager 204 provides the copy of the permanent authentication data to operation data manager 202.

At block 8, operation data manager 202 provides the copy of the permanent authentication data to controller 222 which compares it to its own copy of the permanent authentication data stored in secured storage device 220. Because the copies of the permanent authentication match, operation data manager 202 is granted write access to the operation data stored in secured storage device.

At block 9, operation data manager 202 modifies the operation data stored in secured storage device 220 using the write access that it obtained with respect to block 8.

Once the operation data update has been processed, write access to the operation data may be revoked and operation data manager 202 may discard the copy of the permanent authentication data.

Thus, as illustrated in FIGS. 3A-3B, the operation data in a secure storage device may be modified to update the operation of the host device, even while the operation data is secured with permanent authentication data.

Figure 4A:
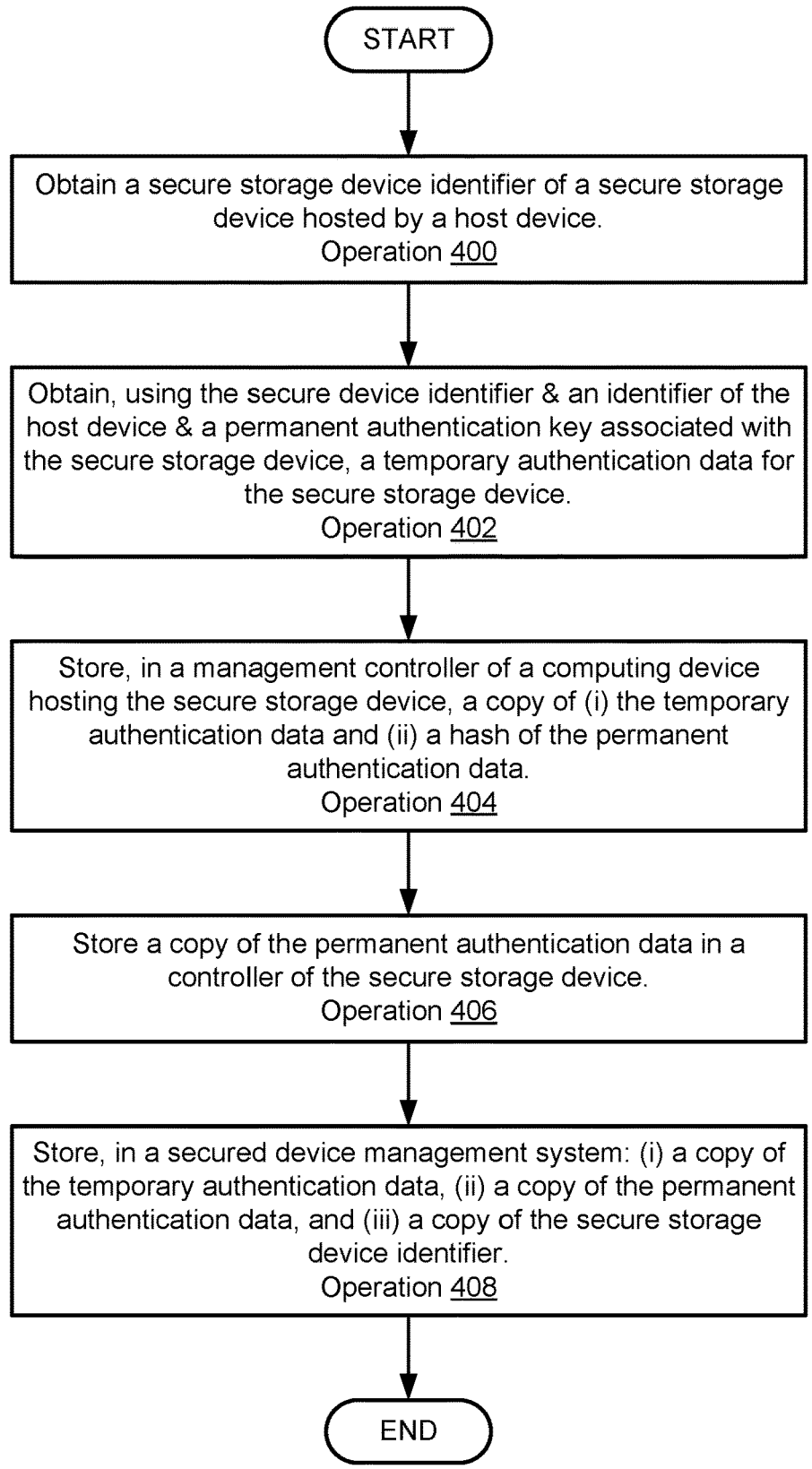
FIG. 4A shows a flow diagram illustrating a method of preparing a host device and system for future changes in operation of the host device in accordance with an embodiment.

To perform the above process, various portions of data may be provided to various components. Turning to FIG. 4A, a flowchart of a method of preparing for future operation data updates in accordance with an embodiment is shown.

Prior to operation 400, a secure storage device may be added to a host device. The secure storage device may not yet have permanent authentication data stored with it.

At operation 400, a secure storage device identifier of a secure storage device hosted by a host device is obtained. The secure storage device identifier may be obtained by, for example, reading it from the secure storage device, obtaining it from a database, or via another method.

At operation 402, temporary authentication data for the secure storage device is obtained. The temporary authentication data may be obtained using the secure device identifier, an identifier of the host device, and a permanent authentication data associated with the secure storage device.

Figure 4B:
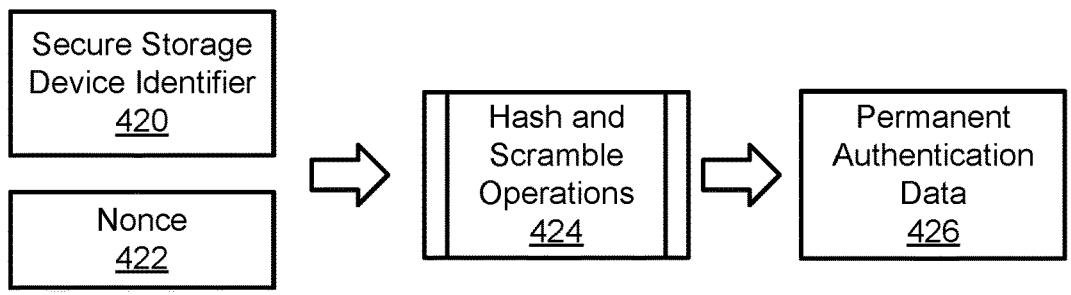
FIG. 4B shows a block diagram illustrating a permanent authentication data generation process in accordance with an embodiment.

The permanent authentication data may be obtained, for example, as shown in FIG. 4B. The temporary authentication data may be obtained, for example, as shown in FIG. 4D.

At operation 404, a copy of the temporary authentication data and a hash of the permanent authentication data is stored in a management controller of the host device. The data and hash may be stored in the management controller by writing the data structures to storage therein.

At operation 406, a copy of the permanent authentication data is stored with a controller of the secure storage device. For example, the permanent authentication data may be stored in storage resources of the secure storage device accessible by the controller, in a special purpose one time write storage device accessible by the controller, etc. When so written, only the controller may have access to the copy of the permanent authentication data.

At operation 408, a copy of the temporary authentication data, a copy of the permanent authentication data, and a copy of the secure storage device identifier are stored in a secured device management system. The aforementioned information may be stored in a searchable format with corresponding data for other secure storage devices. The data may be stored in, for example, a table, database, list, etc. where the identifier of the secure storage device may be used as a key. When used as a key, the permanent and temporary authentication data may be identified and/or used.

The method may end following operation 408.

Using the method illustrated in FIG. 4A, the various components of the system of FIG. 1 may be placed in a state such that operation data for the host device may be updated over time. The secured device management system and controller may each have access to a copy of the permanent authentication data while other entities hosted by the host device may not have access to the permanent authentication data. Thus, until a copy of the permanent authentication data is retrieved from the secured device management system, the operation data of the host device may not be able to be modified.

Figure 4C:
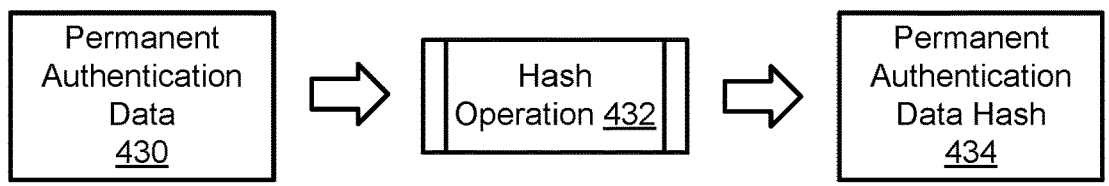
FIG. 4C shows a block diagram illustrating a permanent authentication data hash generation process in accordance with an embodiment.
Figure 4D:
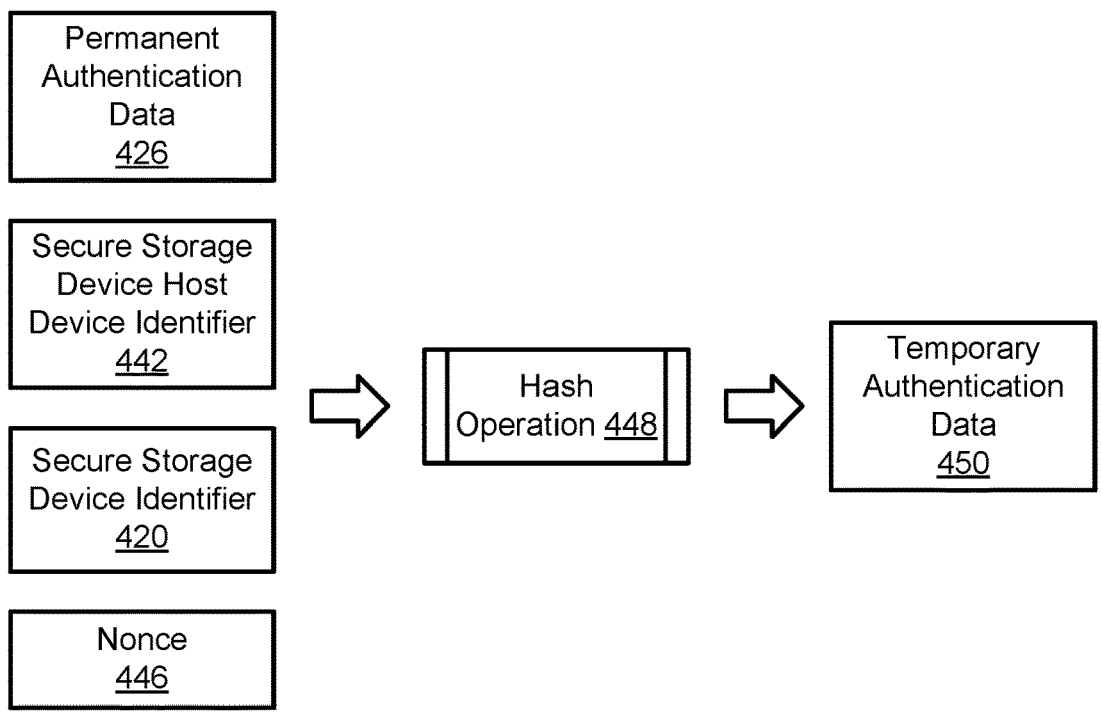
FIG. 4D shows a block diagram illustrating a temporary authentication data hash generation process in accordance with an embodiment.

Turning to FIGS. 4B-4D, each of these figures illustrates a diagram of a data processing operation that may be performed.

Turning to FIG. 4B, a data processing operation to obtain permanent authentication data in accordance with an embodiment is shown. To obtain permanent authentication data 426, secure storage device identifier 420 may be combined with nonce 422 (e.g., via an append operation, a join, or other type of combination operation). The combination may then be subjected to hash and scramble operations 424.

For example, a hash function may be used to obtain a hash of the combination. The hash of the combination may then be scrambled to obtain permanent authentication data 426. Scrambling may interchange the position of various bits in a bit sequence representing the hash.

In an embodiment, nonce 422 is a random or pseudo-random number that may not be reused. Nonce 422 may be of a length such that replay attacks on permanent authentication data 426 may be ineffective.

Once obtained, permanent authentication data 426 may be stored in a secure storage device and in a secured device management system.

Turning to FIG. 4C, a data processing operation to obtain permanent authentication data hash 434 in accordance with an embodiment is shown. To obtain permanent authentication data hash 434, permanent authentication data 430 may be subject to a hash. The hash may be similar to or different from that in operations 424. The result of hash operation 432 performed on permanent authentication data 430 may be permanent authentication data hash 434.

Once obtained, permanent authentication data hash 434 may be stored in a management controller.

Turning to FIG. 4D a data processing operation to obtain temporary authentication data 450 in accordance with an embodiment is shown. To obtain temporary authentication data 450, permanent authentication data 426, secure storage device host device identifier 442, secure storage device identifier 420, and nonce 446 may be combined (e.g., via an append operation, a join, or other type of combination operation). Secure storage device host device identifier 442 may be an identifier (e.g., a service tag) of a host device that will host the secure storage device. The combination may then be subjected to hash operation 448.

For example, a hash function may be used to obtain a hash of the combination. The hash may be used as temporary authentication data 450.

Once obtained, temporary authentication data 450 may be stored in a management controller and the secured device management system. Additionally, a copy of secure storage device identifier 420 may also be stored in secured device management system to allow for permanent authentication data 426 and temporary authentication data 450 to be looked up using secure storage device identifier 420 as a key.

In an embodiment, permanent authentication data 426 and temporary authentication data 450 are respective keys generated by applying a secure hash algorithm to the input data illustrated in FIGS. 4B-4C.

In an embodiment, storing the portions of data as described in FIGS. 4B-4D may bind the secure storage device and the host device. For example, the data stored in the secured device management system may indicate that the secure storage device has been provisioned to the host device. However, if the secure storage device may be moved to another device or the host device may be retired, the contents of the data stored in FIGS. 4B-4D may be updated.

Figure 5A:
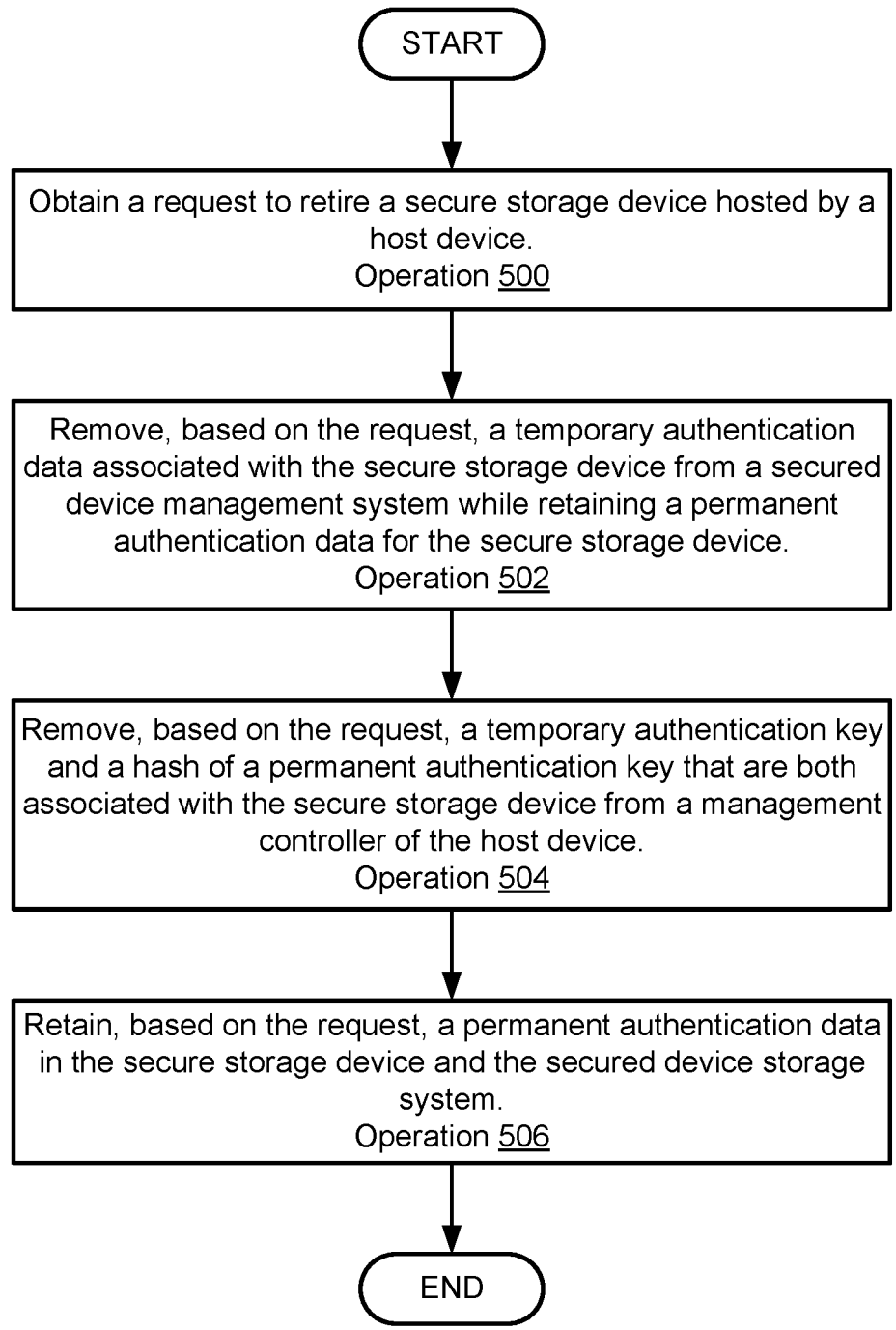
FIG. 5A shows a flow diagram illustrating a method of servicing a retirement request in accordance with an embodiment.

Turning to FIG. 5A, a flowchart of a method of servicing a request to retire a host device in accordance with an embodiment is shown.

At operation 500, a request to retire a secure storage device hosted by a host device is obtained. The request may be obtained by a secured device management system. The request may be obtained from any entity without departing from embodiments disclosed herein. The request may include an identifier of a secure storage device hosted by the host device.

At operation 502, temporary authentication data associated with the secure storage device is removed from the secured device management system while retaining permanent authentication data for the secure storage device. For example, the identifier of the secure storage device may be used to identify the temporary authentication data (e.g., by looking it up with the identifier of the secure storage device). The identified temporary authentication may then be removed. By removing the temporary authentication data, the secure storage device may no longer be associated with the host device. For example, as seen in FIG. 2D the temporary authentication data may be based in part on an identifier of the host device.

At operation 504, the temporary authentication data and a hash of the permanent authentication data that are both associated with the secure storage device are removed from a management controller of the host device.

At operation 506, the permanent authentication data is retained in both the secure storage device and the secured device storage system. For example, when the permanent authentication key is stored in the secure storage device, it may be done so in a manner that cannot be changed. For example, the permanent authentication key may be stored in a single write storage of a controller of the secure storage device. Consequently, the copy of the permanent authentication data stored in the secured device management system may be retained so that it will be available for future use.

The method may end following operation 506.

Following the method shown in FIG. 5A, the data in the secured device management system may indicate that the secured storage device is not provisioned to any host device. To provision the secured storage device, the method shown in FIG. 5B may be performed.

Figure 5B:
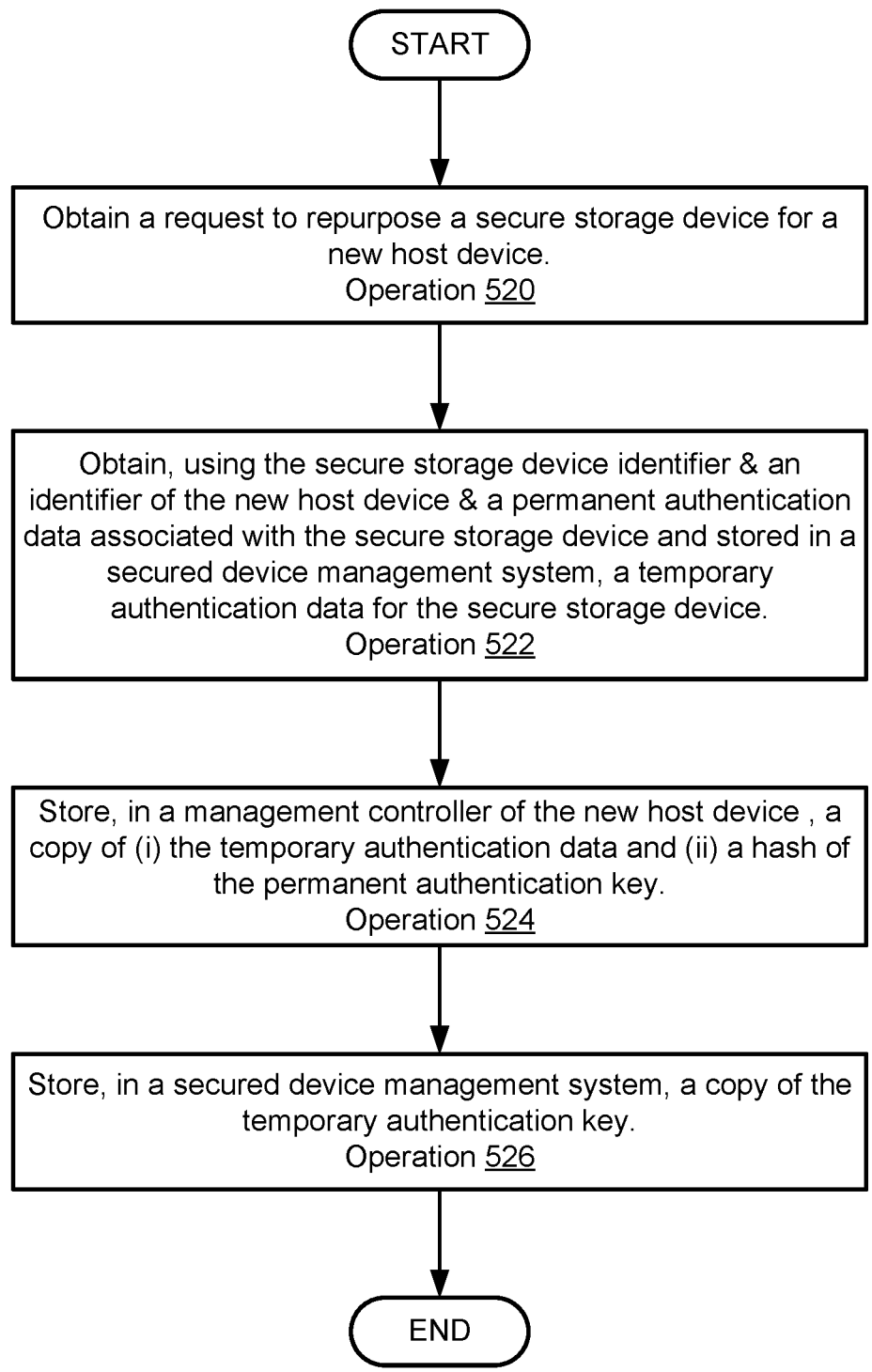
FIG. 5B shows a flow diagram illustrating a method of servicing a repurpose request in accordance with an embodiment.

Turning to FIG. 5B, a flowchart of a method of servicing a repurpose request for a secure storage device in accordance with an embodiment is shown.

At operation 520, a request to repurpose a secure storage device for a new host device is obtained. In contrast to the method shown in FIG. 4A which may be performed for a secure storage device that has never been previously provisioned, the method of FIG. 5B may be usable to repurpose a secure storage device to which permanent authentication data has been previously stored.

At operation 522, new temporary authentication data for the secure storage device is obtained. The new temporary authentication data may be obtained using an identifier of the secure storage device, an identifier of the new host device, and a permanent authentication data previously stored in the secure storage device (e.g., a copy of which may be stored in the secured device management system and associated with the secure storage device).

In an embodiment, the new temporary authentication data is obtained by performing the data processing as shown in FIG. 4D. However, the identifier of the host device may be used as the secure storage device host device identifier 442 and a new nonce 446 may be used (e.g., so as not to reuse nonce 446).

At operation 524, a copy of the new temporary authentication data and a hash of the permanent authentication data is stored in a management controller of the new host.

At operation 526, a copy of the new temporary authentication data is stored in the secured device management system. The copy of the new temporary authentication data may be associated with the permanent management data and identifier of the secure storage device previously stored in the secured device management system. Consequently, when a lookup using the identifier of the secure storage device is performed, the lookup may return the new temporary authentication data and the permanent authentication data.

The method may end following operation 526.

Figure 6:
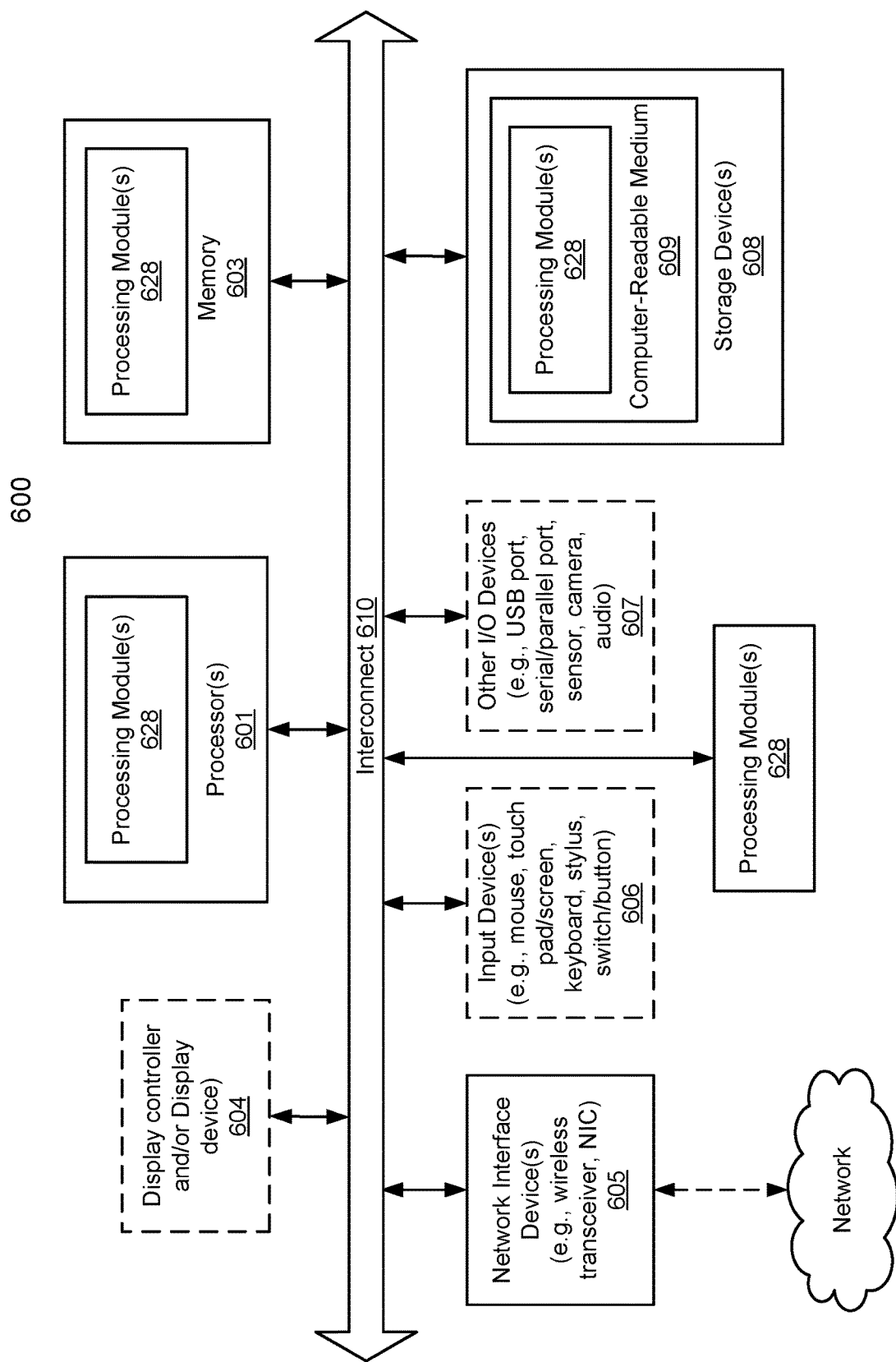
FIG. 6 is a block diagram illustrating a data processing system in accordance with an embodiment.

Any of the components illustrated in FIGS. 1-5B may be implemented with one or more computing devices. Turning to FIG. 6, a block diagram illustrating an example of a data processing system (e.g., a computing device) in accordance with an embodiment is shown. For example, system 600 may represent any of data processing systems described above performing any of the processes or methods described above. System 600 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 600 is intended to show a high level view of many components of the computer system. However, it is to be understood that additional components may be present in certain implementations and furthermore, different arrangement of the components shown may occur in other implementations. System 600 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 600 includes processor 601, memory 603, and devices 605-608 via a bus or an interconnect 610. Processor 601 may represent a single processor or multiple processors with a single processor core or multiple processor cores included therein. Processor 601 may represent one or more general-purpose processors such as a microprocessor, a central processing unit (CPU), or the like. More particularly, processor 601 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 601 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 601, which may be a low power multi-core processor socket such as an ultra-low voltage processor, may act as a main processing unit and central hub for communication with the various components of the system. Such processor can be implemented as a system on chip (SoC). Processor 601 is configured to execute instructions for performing the operations discussed herein. System 600 may further include a graphics interface that communicates with optional graphics subsystem 604, which may include a display controller, a graphics processor, and/or a display device.

Processor 601 may communicate with memory 603, which in one embodiment can be implemented via multiple memory devices to provide for a given amount of system memory. Memory 603 may include one or more volatile storage (or memory) devices such as random access memory (RAM), dynamic RAM (DRAM), synchronous DRAM (SDRAM), static RAM (SRAM), or other types of storage devices. Memory 603 may store information including sequences of instructions that are executed by processor 601, or any other device. For example, executable code and/or data of a variety of operating systems, device drivers, firmware (e.g., input output basic system or BIOS), and/or applications can be loaded in memory 603 and executed by processor 601. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 600 may further include 10 devices such as devices (e.g., 605, 606, 607, 608) including network interface device(s) 605, optional input device(s) 606, and other optional 10 device(s) 607. Network interface device(s) 605 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 606 may include a mouse, a touch pad, a touch sensitive screen (which may be integrated with a display device of optional graphics subsystem 604), a pointer device such as a stylus, and/or a keyboard (e.g., physical keyboard or a virtual keyboard displayed as part of a touch sensitive screen). For example, input device(s) 606 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 607 may include an audio device. An audio device may include a speaker and/or a microphone to facilitate voice-enabled functions, such as voice recognition, voice replication, digital recording, and/or telephony functions. Other IO devices 607 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 607 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 610 via a sensor hub (not shown), while other devices such as a keyboard or thermal sensor may be controlled by an embedded controller (not shown), dependent upon the specific configuration or design of system 600.

To provide for persistent storage of information such as data, applications, one or more operating systems and so forth, a mass storage (not shown) may also couple to processor 601. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 601, e.g., via a serial peripheral interface (SPI). This flash device may provide for non-volatile storage of system software, including a basic input/output software (BIOS) as well as other firmware of the system.

Storage device 608 may include computer-readable storage medium 609 (also known as a machine-readable storage medium or a computer-readable medium) on which is stored one or more sets of instructions or software (e.g., processing module, unit, and/or processing module/unit/logic 628) embodying any one or more of the methodologies or functions described herein. Processing module/unit/logic 628 may represent any of the components described above. Processing module/unit/logic 628 may also reside, completely or at least partially, within memory 603 and/or within processor 601 during execution thereof by system 600, memory 603 and processor 601 also constituting machine-accessible storage media. Processing module/unit/logic 628 may further be transmitted or received over a network via network interface device(s) 605.

Computer-readable storage medium 609 may also be used to store some software functionalities described above persistently. While computer-readable storage medium 609 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 628, components and other features described herein can be implemented as discrete hardware components or integrated in the functionality of hardware components such as ASICS, FPGAs, DSPs or similar devices. In addition, processing module/unit/logic 628 can be implemented as firmware or functional circuitry within hardware devices. Further, processing module/unit/logic 628 can be implemented in any combination hardware devices and software components.

Note that while system 600 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments of the invention as described herein.

In the foregoing specification, embodiments have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for managing operation of a host device, the method comprising:
   obtaining an update to operation data stored on a secure storage device of the host device that is secured with a permanent authentication key, the operation data defining how the host device operates;
   in response to obtaining the update:
     establishing, by a management controller of the host device and using a temporary authentication key stored in the management controller, a secure communication channel to a secured device management system;
     obtaining, by the management controller and with the secure communication channel, a copy of the permanent authentication key;
     verifying authenticity of the permanent authentication key using a copy of a hash of the permanent authentication key hosted by the management controller; and
     modifying, with the update and the permanent authentication key, the operation data in the secure storage device.

2. The computer-implemented method of claim 1, wherein the operation data is modified by an application hosted with a processor of the host device, the host device does not have access to a copy of the permanent authentication key other than via the management controller, the management controller provides the permanent authentication key to the application after the authenticity of the permanent authentication key is verified, and the management controller is adapted to not provide the permanent authentication key to the application unless the permanent authentication key is validated.

3. The computer-implemented method of claim 1, further comprising:
   prior to obtaining the update:
     generating the permanent authentication key with an identifier of the secure storage device;
     storing a first copy of the permanent authentication key in a controller of the secure storage device;
     storing a second copy of the permanent authentication key in the secured device management system, the secured device management system being remote to the host device;
     generating the hash of the permanent authentication key to obtain a permanent authentication key hash; and
     storing a copy of the permanent authentication key hash in the management controller.

4. The computer-implemented method of claim 3, further comprising:
   prior to obtaining the update:
     generating the temporary authentication key with an identifier of the host device, the identifier of the secure storage device, and the permanent authentication key;
     storing a first copy of the temporary authentication key in the management controller; and
     storing a second copy of the temporary authentication key in the secured device management system.

5. The computer-implemented method of claim 4, further comprising:
   after modifying the operation data:
     obtaining a retirement request associated with the host device;
     based on the retirement request:
       removing all copies of the temporary authentication key from the secured device management system and the management controller; and
       removing a copies of the permanent authentication key hash from the management controller.

6. The computer-implemented method of claim 5, further comprising:
   after servicing the retirement request:
     obtaining a repurposing request associated with a new host device;
     based on the repurposing request:
       generating a second temporary authentication key using an identifier of the new host device, the identifier of the secure storage device, and the permanent authentication key; and
       storing a first copy of the second temporary authentication key in a second management controller of the new host device;
       storing a second copy of the second temporary authentication key in the secured device management system; and
       storing the permanent authentication key hash in the second management controller of the new host device.

7. The computer-implemented method of claim 6, wherein servicing the retirement request disassociates the secure storage device from the host device and servicing the repurposing request associates the new host device with the secure storage device, the secured device management system being adapted to track the associations between host devices and secure storage devices.

8. The computer-implemented method of claim 1, wherein the management controller operates independently from the host device, the management controller and the host device each comprising respective computing devices.

9. The computer-implemented method of claim 1, wherein obtaining the permanent authentication key comprises:

providing an identifier of the secure storage device to the secured device management system;

using, by the secured device management system, the identifier of the secure storage device as a key to identify the copy of the permanent authentication key stored in the secured device management system; and transmitting, with the secure communication channel, the copy of the permanent authentication key from the secured device management system to the management controller.

10. The computer-implemented method of claim 1, further comprising:

prior to modifying the operation data in the secure storage device:

comparing, by a controller of the secure storage device, the copy of the permanent authentication key to another copy of the permanent authentication key stored in the controller;

based on the copy of the permanent authentication key matching the permanent authentication key, authorizing write access to the operation data for an application hosted with a processor of the host device.

11. A host device, comprising:

a secure storage device comprising a controller, the secure storage device storing operation data and a permanent authentication key;

a management controller; and a processor adapted execute an application configured to:

obtain an update to the operation data, the operation data being secured with the permanent authentication key and defining how the host device operates;

in response to obtaining the update:

initiate establishment, by the management controller, of a secure communication channel to a secured device management system using a temporary authentication key stored in the management controller;

initiate retrieval, by the management controller and with the secure communication channel, of a copy of the permanent authentication key from the secured device management system;

initiate verification, by the management controller, of the copy of the permanent authentication key with a copy of a hash of the permanent authentication key stored in the management controller; and modify, with the update and the permanent authentication key, the operation data in the secure storage device.

12. The host device of claim 11, wherein the host device is implemented with a first computing device, the management controller is implemented with a second computing device, and the first computing device and second computing device operate independently.

13. The host device of claim 12, wherein the permanent authentication key stored in the secure storage device is only readable by the controller of the secure storage device, wherein the temporary authentication key and the hash of the permanent authentication key stored in the management controller is only readable by the management controller, wherein the management controller does not persistently store any copies of the permanent authentication key.

14. The host device of claim 11, wherein the application is further configured to:

after modifying the operation data:

discard the copy of the permanent authentication key.

15. The host device of claim 11, wherein the operation data is stored in a read only state and the processor is adapted to provide write access to the operation data only when the copy of the permanent authentication key is provided.

16. A non-transitory machine-readable medium having instructions stored therein, which when executed by a processor, cause the processor to operate a host device comprising a secure storage device comprising a controller, and a management controller, the operations comprising:

obtaining an update to operation data stored in the secure device storage, the operation data being secured with a permanent authentication key stored in the secure storage device and defining how the host device operates;

in response to obtaining the update:

initiating establishment, by the management controller, of a secure communication channel to a secured device management system using a temporary authentication key stored in the management controller;

initiating retrieval, by the management controller and with the secure communication channel, of a copy of the permanent authentication key from the secured device management system;

initiating verification, by the management controller, of the copy of the permanent authentication key with a copy of a hash of the permanent authentication key stored in the management controller; and modifying, with the update and the permanent authentication key, the operation data in the secure storage device.

17. The non-transitory machine-readable medium of claim 16, wherein the host device is implemented with a first computing device, the management controller is implemented with a second computing device, and the first computing device and second computing device operate independently.

18. The non-transitory machine-readable medium of claim 17, wherein the permanent authentication key stored in the secure storage device is only readable by the controller of the secure storage device, wherein the temporary authentication key and the hash of the permanent authentication key stored in the management controller is only readable by the management controller, wherein the management controller does not persistently store any copies of the permanent authentication key.

19. The non-transitory machine-readable medium of claim 16, wherein the operations further comprises:

after modifying the operation data, discarding the copy of the permanent authentication key.

20. The non-transitory machine-readable medium of claim 16, wherein the operation data is stored in a read only state and the processor is adapted to provide write access to the operation data only when the copy of the permanent authentication key is provided.

* * * * *

UNITED STATES PATENT AND TRADEMARK OFFICE
CERTIFICATE OF CORRECTION

PATENT NO. : 12,126,731 B2
APPLICATION NO. : 17/513149
DATED : October 22, 2024
INVENTOR(S) : Venkata Rama Krishna Rao Atta et al.

It is certified that error appears in the above-identified patent and that said Letters Patent is hereby corrected as shown below:

In the Claims

Claim 19, Column 26, Line 53, the word "comprises" should read -- comprise --.

Signed and Sealed this
Third Day of December, 2024

Katherine Kelly Vidal
*Director of the United States Patent and Trademark Office*